(12) United States Patent
Tsipov

(10) Patent No.: US 6,725,895 B1
(45) Date of Patent: Apr. 27, 2004

(54) WHEEL

(76) Inventor: Michael Tsipov, 30-26 Brighton 14th St., Brooklyn, NY (US) 11235

( * ) Notice: Subject to any disclaimer, the term of this patent is extended or adjusted under 35 U.S.C. 154(b) by 0 days.

(21) Appl. No.: 09/642,708

(22) Filed: Aug. 21, 2000

Related U.S. Application Data

(63) Continuation-in-part of application No. 09/197,840, filed on Nov. 23, 1998, now abandoned.

(51) Int. Cl.[7] .................................................. B60C 5/24
(52) U.S. Cl. ................. 152/415; 152/332.1; 152/334.1; 152/416; 305/1; 305/60
(58) Field of Search ................................ 305/1, 4, 5, 7, 305/19, 60; 301/1, 5.1, 6.5; 152/53, 54, 334.1, 332.4, 337.1, 338.1, 151, 152, DIG. 5; 180/7.1, 8.1

(56) References Cited

U.S. PATENT DOCUMENTS

| | | | |
|---|---|---|---|
| 2,859,791 A | * | 11/1958 | Pellegrino ................. 152/334.1 |
| 3,194,180 A | * | 7/1965 | Mackerle ..................... 180/7.1 |
| 5,492,390 A | * | 2/1996 | Kugelmann, Sr. ............ 301/5.1 |

FOREIGN PATENT DOCUMENTS

| | | | | |
|---|---|---|---|---|
| SU | 1081004 | * | 3/1984 | ..................... 305/5 |
| SU | 1303442 | * | 4/1987 | ..................... 305/4 |
| SU | 1641652 | * | 4/1991 | ..................... 305/4 |

OTHER PUBLICATIONS

Antigravity: A Brief Mystery of Time; Otis Port; Business-Week issue 3569; Mar. 16, 1998.*

* cited by examiner

Primary Examiner—Russell D. Stormer
(74) Attorney, Agent, or Firm—I. Zborovsky

(57) ABSTRACT

A wheel has a rigid rim, a soft tire arranged on the rigid rim, and a unit for generating different pressures from inside in the soft tire in contact zone of tire with road surface, at opposite sides of a vertical transverse plane of symmetry of the rim so as to cause pushing of the tire with rim of wheel along a roadway, the tire being subdivided in a plurality of separate chambers spaced from one another in a circumferential direction, the unit for generating different pressures being operative for generating different pressures in a computerized way in any chamber of the tire at any time.

9 Claims, 5 Drawing Sheets

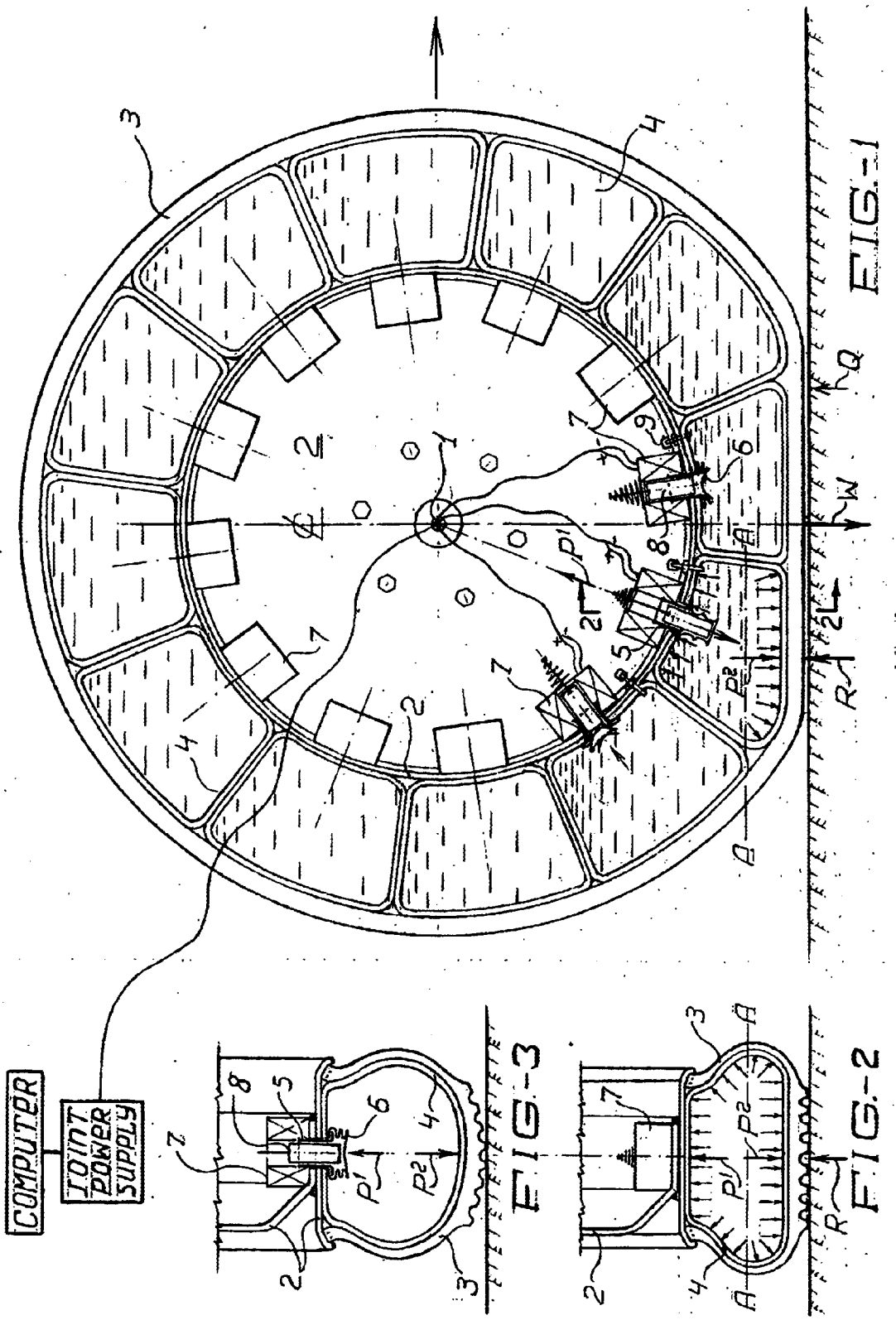

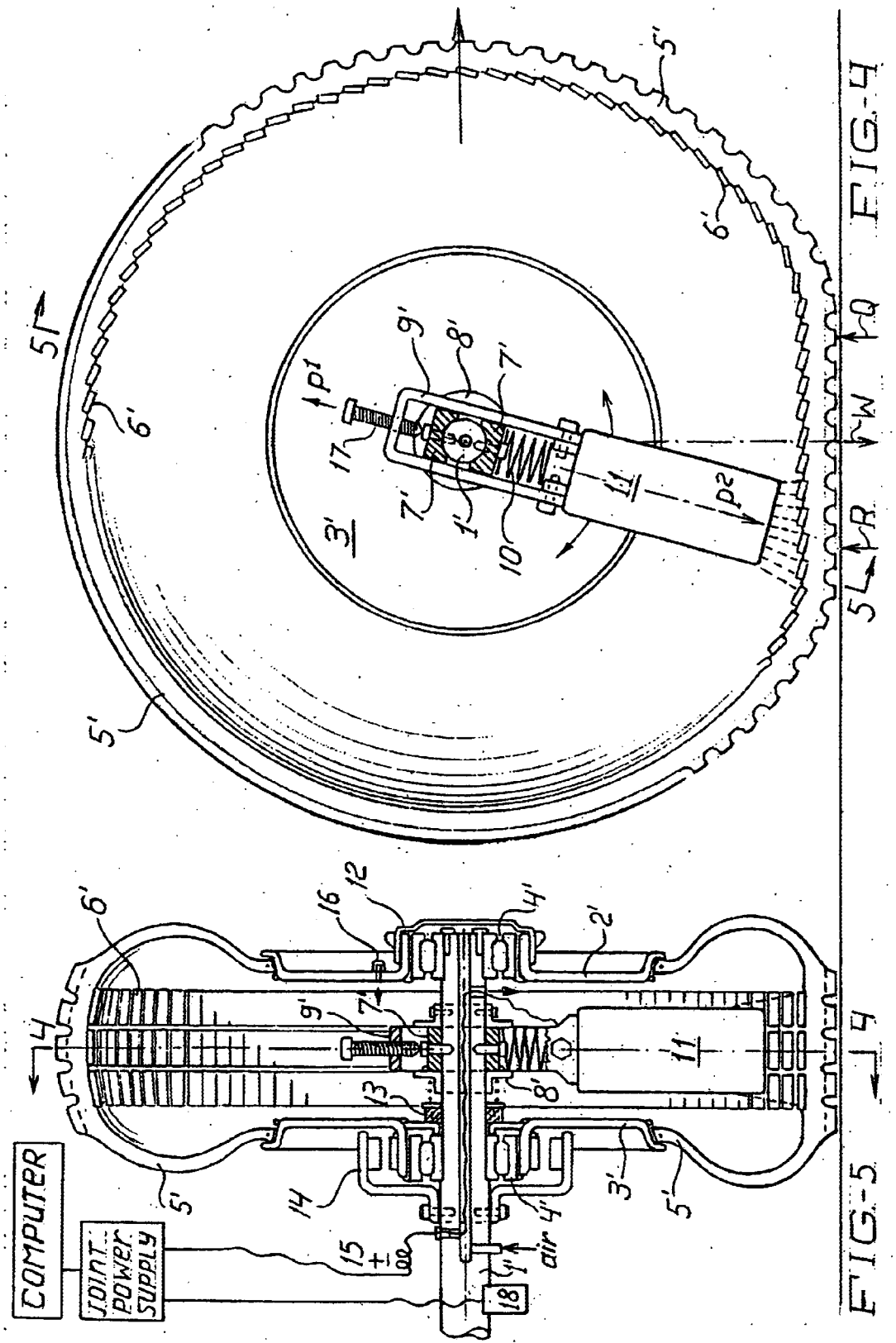

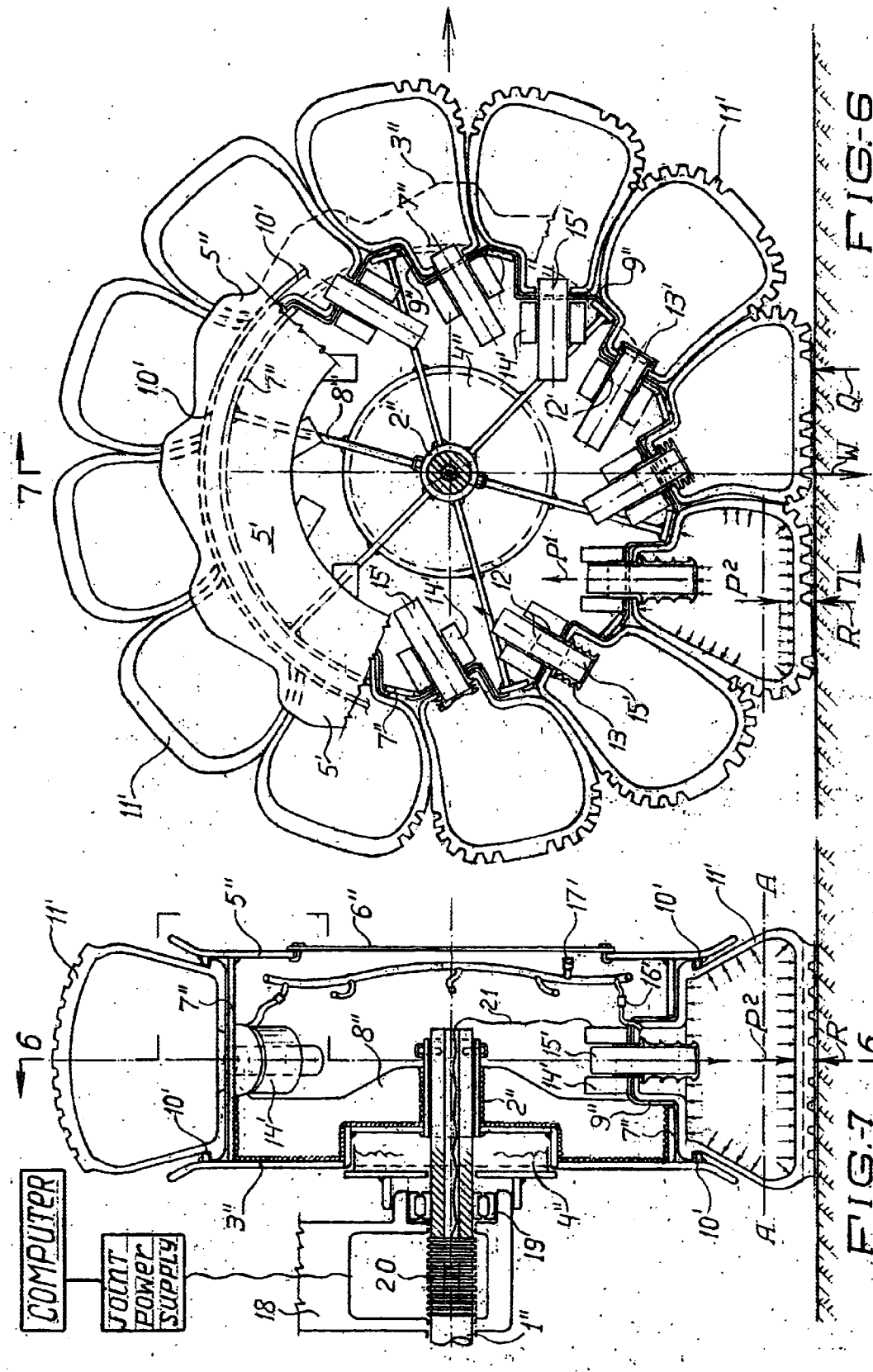

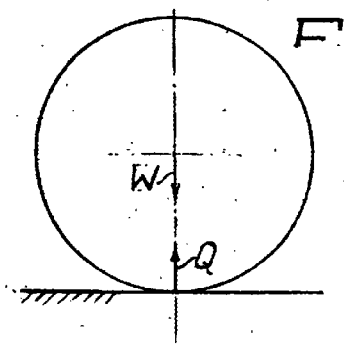
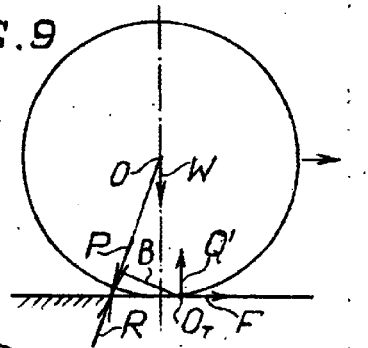
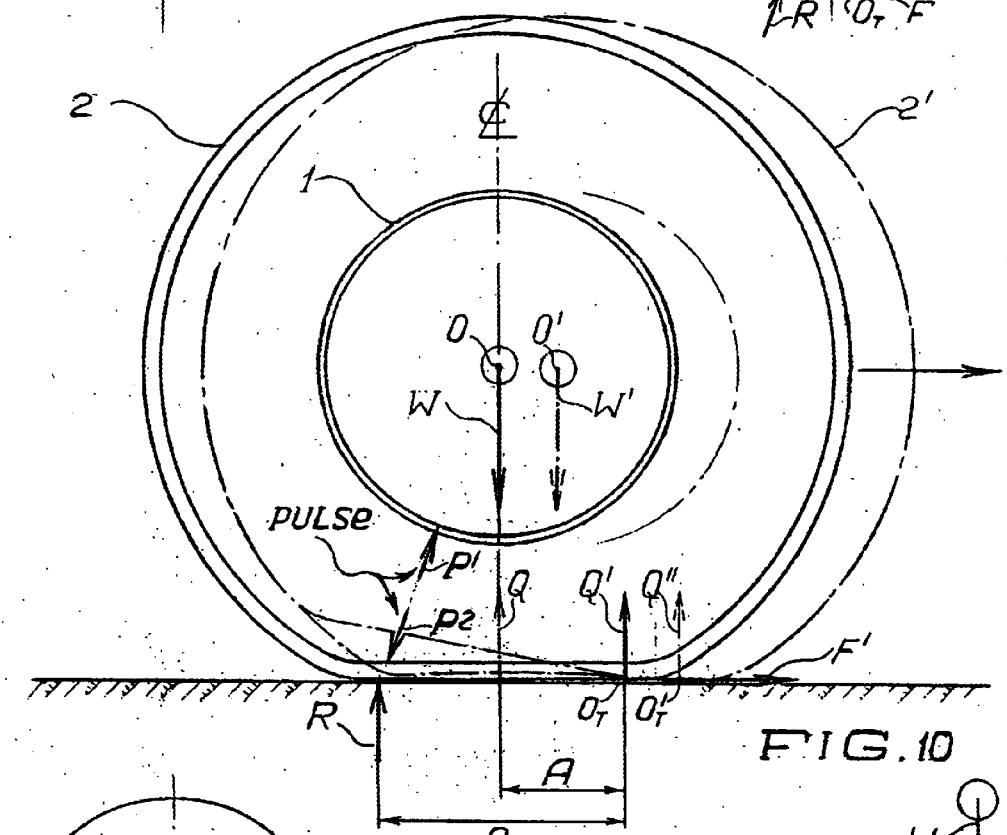
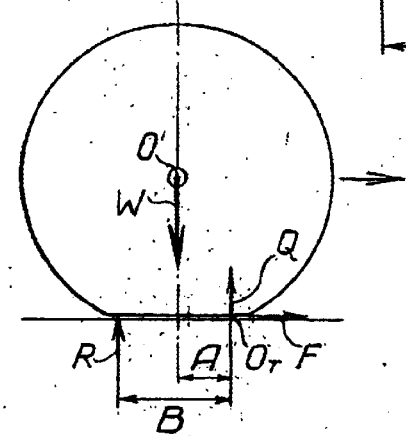
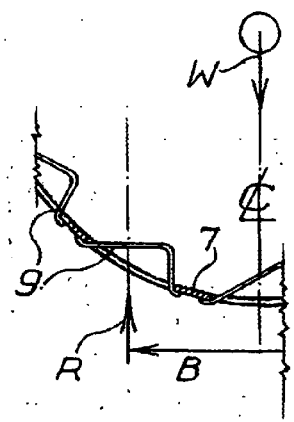
FIG.8  FIG.9
FIG.10
FIG.11  FIG.12

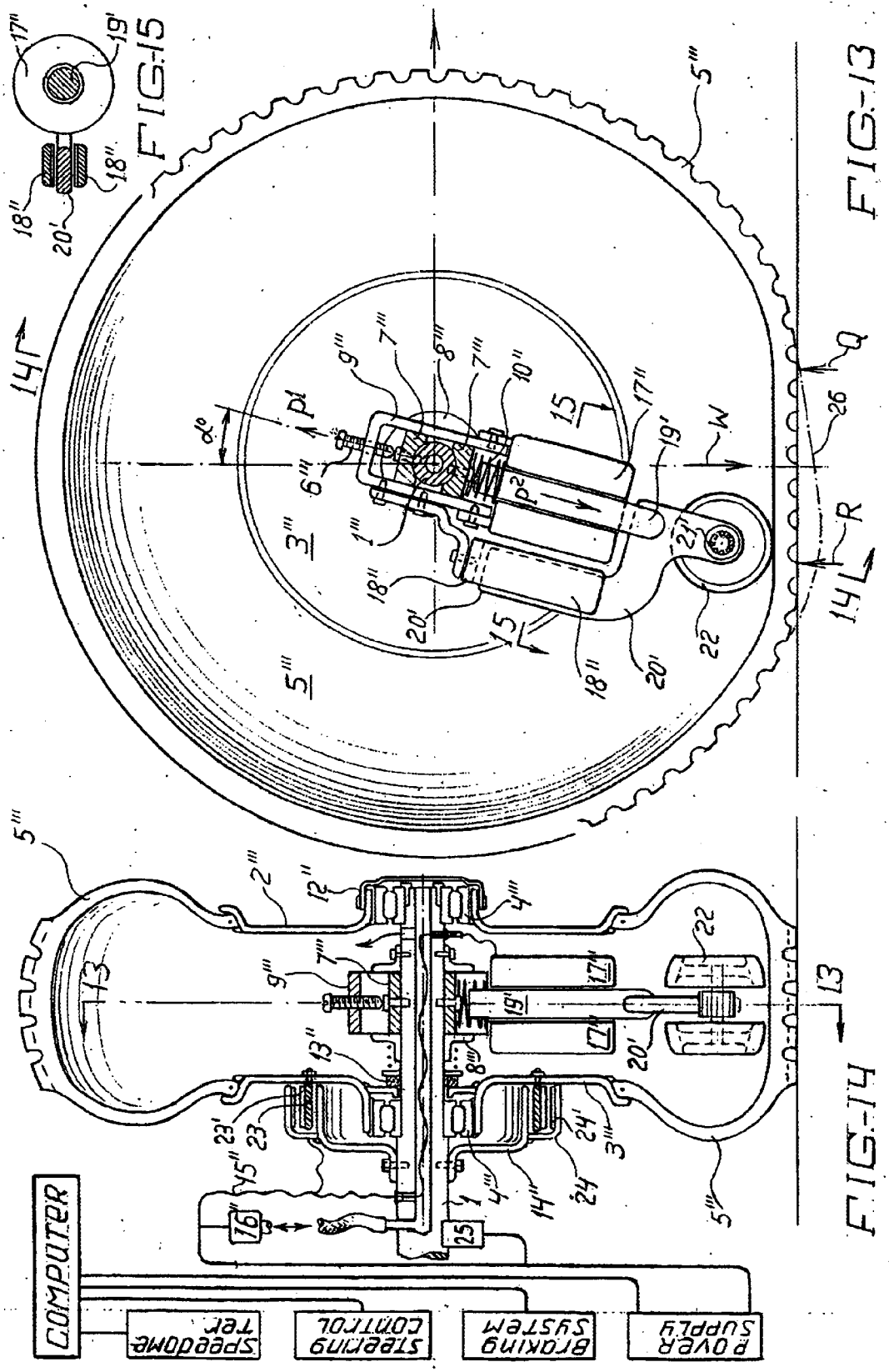

WHEEL

CROSS-REFERENCE TO A RELATED APPLICATION

This application is a continuation-in-part of application Ser. No. 09/197,840, now abandoned filed Nov. 23, 1998.

BACKGROUND OF THE INVENTION

The present invention relates generally to wheels. Wheels are widely known and used in vehicles for transportation. It is believed that it is advisable to further improve these existing wheels and to provide wheels having superior qualities when compared with the existing wheels.

SUMMARY OF THE INVENTION

Accordingly, it is an object of the present invention to provide a wheel which has a simpler mechanism of its rolling, reduces energy consumption, is completely ecologically clean, and also can use modern technology of elastic materials.

In keeping with these objects and with others which will become apparent hereinafter, one feature of present invention resides in a wheel which has a rigid rim with an elastic tire arranged on the rim and filled with a fluid so that when the wheel is loaded, a broad contact of an outer surface of the tire with a road surface is provided, or in other words a "flat" is permitted. While in known wheels the flat causes an additional resistance to rolling, in the wheel in accordance with the present invention this flat useful.

In accordance with the present invention, on the longitudinally increased area of support of the tire against a surface of a roadway, different pressures are generated and maintained at both sides of a vertical plane of symmetry of the wheel or its hub. The greater pressure inside the wheel pushes the wheel from the surface toward the side with the lower pressure, so as to create rolling away. Therefore, the method of rolling of a wheel which carries a load is connected with controlling of the deformation of a contact surface of the wheel with the roadway.

A local pressure increase on the wheel surface can be generated in a desired location and at a desired moment by a force or a force pulse from a drive in the wheel. The drive uses a restoring deformation of the elastic tire on the rim of the wheel at the point of contact with the roadway, in order to obtain a reaction push of the road and therefore a movement moment.

In order to obtain the force and the pulse for such a drive, pneumatic, aerostatic, aerodynamic, hydrostatic, hydrodynamic, electromagnetic, electromechanical, mechanical superconductive, and other elements and processes can be used.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing an inventive wheel with a hydraulic pulse, in a longitudinal section;

FIG. 2 is a view showing a section II—II of the wheel of FIG. 1 in a "flat" position;

FIG. 3 is a view substantially corresponding to the view of FIG. 2 but showing the wheel in a restoring position;

FIG. 4 is a view showing an inventive wheel with an electromagnetic pulse, in a longitudinal section;

FIG. 5 is a view showing the wheel of FIG. 4 in a transverse section;

FIG. 6 is a view showing an inventive wheel with an air pulse, in a longitudinal section;

FIG. 7 is a view showing the wheel of FIG. 6 in a transverse section;

FIG. 8 is a diagram of the wheel illustrating forces acting of the wheel in a stationary position;

FIG. 9 is a view showing a diagram of the wheel with pulses and forces in the beginning of a movement cycle;

FIG. 10 is a view showing a diagram of the wheel with all acting forces in a full movement cycle;

FIG. 11 is a view showing a diagram of the forces acting on the wheel of the embodiment of FIG. 6; and FIG. 12 is a view showing the fragment of the inventive wheel of FIG. 6 illustrating a support force application;

FIG. 13 is a view showing an inventive wheel with an electromechanical pulse, in a longitudinal section; and FIG. 14 is a view showing the wheel of FIG. 13 in a transverse section.

FIG. 15 is a view showing a section of solenoids of the inventive.

DESCRIPTION OF THE PREFERRED EMBODIMENTS

The wheel is shown in FIGS. 1, 2 and 3 and illustrates an embodiment of the wheel with a hydraulic pulse. A wheel in accordance with the present invention is mounted on a shaft 1 and has a cylindrical rim 2. A cord-rubber tire 3 is arranged on the rim. Segment chambers composed of elastic material 4 are arranged in the tire. In the center of the rear side of the chambers and in the adjoining rim, openings are provided for passage of metal bushings 5. Hermetic hoses of elastic fabric 6 are arranged on the flanges of the bushings and inserted in the chambers. Solenoids 7 are screwed tightly on the bushings 5 from the inner side of the hose. The solenoids are provided with plungers 8 which are connected with a restoring spring. All solenoids are electrically connected to a joint power supply system. Nipples from chambers with screwed-on covers 9 extend from the openings of the rim. A hydraulic medium, for example light, low viscous oil is introduced through the nipple into the chambers until they are completely filled. Such a wheel, after its mounting, settles down or becomes flat after obtaining a calculated load applied to its axis. The degree of optimal settling is selected experimentally. The lower portion of the tire must obtain a substantially wide area of contact with a surface of the road.

FIGS. 4 and 5 show an inventive wheel with an electromagnetic pulse. A hollow wheel is arranged on an axle or a semi-axle 1' which is not rotatable in this embodiment. The wheel is formed as a vessel which is filled with gas and limited by discs and a tire. The wheel has a front disc 2' and a rear disc '3' supported on an axle with roller bearings 4'. The contours of the discs have shaped projections for receiving the flanges of a deep cord-rubber tire 5'. Two bars 7' are mounted inside the wheel on the axle 1' by means of the bolts. Two ring stoppers 8' are fitted on the axle 1' at both sides of the bars. The left stopper, after mounting of the bars, is welded to them from above and from below. After this, a frame 9' is introduced from the end side on the bars. Then the second, right stopper 8' is fitted on the axle, and fixed to the axle 1' by two mounting screws. An electromagnet 11' is mounted on the lower part of the frame by means of bolts. As can be seen from the drawing, the frame for the electromagnet can move on the bars 7' upwardly and downwardly, and can turn only together with the axle 1' for angle correction. For this purpose the frame has an adjusting bolt 17 from above and a damping spring 10 from below. In order to obtain the most efficient pulse in the assembled wheel, a working angle of inclination of the frame with the electromagnet is determined experimentally. Also, by experiments, a minimal low allocation of the magnet is determined.

Cord strips with inserted magnetiziable ferromagnetic plates 6' are vulcanized on the inside central surface of the tire, along its perimeter. The plates 6 are arranged at an angle to the inner line of the rim. The angle of the plates 6 is determined after the determination of the working angle of the inclination of the working electromagnet since the plates in the zone of the pulse must be mutually perpendicular. If however the surface of the plates is not flat and is sufficiently springy for the pressure of the magnetic flux at any angle, their lower side can be parallel to the circumference of the rim.

A bearing is arranged at the front side of the wheel, and covered by a air tightness cover '12 screwed on the disc 2'. In order to provide hermitization of the wheel from the rear side, a coupling 13 is arranged so as to embrace the axle 1'. The coupling reduces an air escape from the wheel and has a high wear and tear. The coupling can be spring-biased from the right side. A brake drum 14 is located at the rear side of the wheel, on the projecting central part of the disc 3'. A power supply for the electrical device in the wheel can be provided through a conductor 15 extending through the interior of the axle 1'. Air can be supplied through a nipple 16 or also through the interior of the axle 1' from the vehicle, for regulation. The wheel is easy to assemble and disassemble.

FIGS. 6 and 7 show an inventive wheel with air pulse. A pipe 2" is arranged on a semi-axle 1" of the vehicle. The wheel is assembled and welded on the pipe 2" and formed as a cylindrical drum. A brake drum 4" is welded to the rear wall of the wheel 3". A front wall of the wheel 5" has a recess with an observation shield 6". A cylindrical rim 7" is welded between the rear and front walls of the wheel. Rectangular openings are provided along the central line of the perimeter of the rim 7". Reinforcing ribs 8" are welded between the pipe 2" and the rim 7". Supporting elements with an angular profile 9" are inserted and fixed from the outer side of the rim in its openings. A ring composed of strips 10' are welded on the inner side of projecting part of the walls of the wheel. Cord-rubber tires 11' are introduced into pockets formed by the strips 10' from both sides, along the whole perimeter of the wheel. Special bushings 12' extend from the center of the rear part of the tires. Hermitic pockets 13' which are composed of a technical fabric and can be folded accordion-like are placed on the flanges of the pipes 12' for accommodation in the tires. Solenoids 14' are tightly placed from the lower side of the wheel on the bushings 12' extending through round openings in the elements 9". Plungers 15' are located in the solenoids through the bushings and reciprocatable under the action of the solenoids. Tubular nipples 16' are provided in the rear part for filling the tires with a hydraulic medium, for example air. They are connected to a distributing pipe with a supply element 17' shown in FIG. 7. The semi-axle extends in a body 18 and is supported on one of the bearings 19. The electrical power supply of the solenoids can be provided by a current collector's 20 located on the axle, and conductors 21 extending from them.

FIGS. 13 and 14 show an inventive wheel with an electromagnetic pulse from solenoid which is converted into a mechanical pulse through an inner pushing wheel.

The design of the wheel is to be moved is the same as the wheel shown in FIGS. 4 and 5, however in order to apply a pulse, instead of an electromagnet, an electrical solenoid which is cylindrical is provided, and an additional auxiliary flat solenoid is provided. The main solenoid 17" is arranged on a frame 9''' and can move with it radially and turn together with the axis of the wheel. The auxiliary solenoid 18" is also arranged independently on the frame 9'''. A core of the main solenoid 19' is welded with its lower part into the flat stabilizer 20'. A roller bearing 21' is arranged in the lower part of the stabilizer. The axle of the wheel pair 22 extends through a bearing 21'. The other part of the stabilizer 20' is introduced into the flat auxiliary solenoid 18" and serves as its flat core. Two flat plates of the solenoid 18" with special winding from the inner side are arranged at both sides of this core 20', see FIG. 15. The main solenoid 17" radially moves its round core with the wheel 22 and applies pressure to the inner surface of the wheel tire 5''' in the zone of contact with a roadway. The solenoid 18" stabilize the state position of the wheel 22 by holding the core in the magnetic field instead of rubbing surfaces, it also additionally contributes to the work of the main solenoid, it maintains the solenoid core 19' in the central position so as to counter act a force which can cause tilting of the core 18'.

The control of the operational solenoid is performed by an on-board computer.

In FIG. 13 the pushing wheel 22 is in an initial position. When the solenoid in the wheel start working, the restoring deformation of the wheel tire 5''' is acting as shown by dash-dot line 26.

As an additional measure, in order to guarantee the operation of the wheel 5" in any conditions, a loop 23 with an electromagnetic winding 23' of a rotor is arranged on the outer side of the disk 3''', while a close member 24 with a winding 24 of stator is arranged at the inner side on the body of the 14 as shown in FIG. 11. The simple electric motor is used for a short-time operation, for example for overcoming a sharp raise of the roadway. Power supply of this motor is from the common source such as a battery In accordance with the present invention, in order to remove heat generated by operating inner devices, heat removers which are not shown in the drawings can be utilized.

The wheel in accordance with the present invention operates in the following manner:

In the wheel of the embodiment with the hydraulic pulse shown in FIGS. 1, 2, 3 in response to a command of the board computer, a solenoid 7 of the chamber located on the road surface or approaching to the road surface obtains an electric charge and extends its plunger. This generates in the chamber a force pulse which, behind the vertical plane of symmetry of the wheel generates an additional pressure in this chamber which is higher than the pressure in the chamber located forwardly of the vertical plane of symmetry. This pressure equally distributes on all inner surfaces of the pressed chamber. In the upper part of the chamber, on the portion adjoining the rigid rim of the wheel and on side inclined portions, above the neutral line A—A unit pressures provide a sum force or a resultant applied in the center and directed perpendicular to the rim. This force is identified is $P_1$. A sum of the unit pressures on the lower side of the chamber located on the surface of the road under the neutral line A—A produces in the center a resultant identified as $P_2$.

In the wheel in accordance an electromagnetic pulse embodiment shown in FIGS. 4 and 5 in the beginning of the movement of the vehicle, the axle 1 is controlled so that the computer of the vehicle turns the axle with the electromagnet to a position fixed as a working angle. Then, after turning on of the power supply the electromagnet starts operating and the magnet generates a repelling magnetic force. The magnetic flux of this of the same name the magnetic field applies pressure to the magnetized ferromagnetic plates located under it. In turn, the plates generate an additional pressure on the lower part of the tire which is supported on the surface of the road. A sum value of this pressure is $P_2$. On the other side of the electromagnet, a reaction force which applies pressure on the axle of the wheel through the spring 10" 10 is generated and identified as $P_1$. In this embodiment the pulse acts instantaneously and uninterruptedly.

In the embodiment of FIG. 6 and 7 with the aerostatic air pulse, in response to a command from the computer in a corresponding chamber and in a corresponding moment of time the solenoid extends the plunger which generates a pulse. The formation of the forces $P_1$ and $P_2$ in the chamber is performed analogously to the embodiments of FIGS. 1, 2, and 3. However, due to the construction of the chambers, the forces $P_1$ and $P_2$ are applied almost on the same vertical line.

In the embodiment of FIGS. 13 and 14, the operation is substantially similar to the embodiment of the wheel shown in FIGS. 4 and 5. However, after turning on of the power supply the solenoid pushes its plunger with the inner wheel-pusher to produce a mechanical pulse under the lower part of the tire. As a result the forces $P_1$ and $P_2$ are identically generated and cause a reaction of the roadway R which pushes and rolls the wheel.

The wheel which is mounted on the axle of the vehicle in a stationary position carries a partial weight applied to the axis of rotation of the wheel. The weight is directed downwardly along a vertical line and is identified as W, see FIG. 8. The pressure of the wheel on the surface of a roadway, which is supported by a part of the rim, produces a reaction of the surface which is equal to the force W plus the weight of the wheel. This reaction is applied perpendicular to the surface or in other words vertical, and its sum value identified as Q is located on the same vertical line with the force W.

In order to move the wheel with the rigid rim a pulse P directed radially is generated at one side of the vertical plane of symmetry of the wheel from the side of the rigid rim as shown in FIG. 9. Then the reaction of the surface of the roadway identified as R acts on the wheel in opposite direction, or in other words perpendicular to its outer rim and pushes away the wheel.

When such a wheel is moved, then the static reaction of the surface Q is displaced along the rim in direction of the movement and assumes the position in the front point of the area of support of the wheel $O_T$. In the new position, the reaction of the surface from rolling of the wheel on assumes the value is $Q_1$. The rolling friction with the surface generated during the movement of the wheel and identified as F is applied also in the point $O_T$ acts tangentially to the rim and is directed in the movement direction if the wheel is a driving wheel.

A rolling moment is however responsible for rolling back and forward of the wheel. The rolling moment is a force multiplied by the arm. In the present case if the point of support of the wheel during rolling away is $O_T$ and the force which pushes the wheel is R there is an arm between them. This arm is always perpendicular to the line of action of the force. Thereby the arm B is produced. The moment R×B rolls the wheel away and overcomes the resistance.

To obtain the described reaction of the surface R from the pulse in the wheel needs a broad contact of the outer rim of the wheel with the surface. It is also necessary to transfer the inner pulse to the rolling surface through the casing of the outer rim. This wheel and this rim correspond to the existing wheels of a vehicle with a hollow cord-rubber tire arranged on the rigid rim, see FIG. 1, 2, 3, 4, 5, 13, 14. A version of tire is shown in FIG. 6, 7.

As explained above, when the force pulse is supplied in a desired moment to a desired location, or in other words to a location in the tire, a segment chamber in the tire, or segmented tire in a slightly deflated condition (not completely filled with a compressed hydraulic medium) it generates an additional specific pressure on all internal surfaces. This creates the elastic force $P_1$ on the upper part of the chamber, and elastic force $P_2$ in the lower part of the chamber which has the flat surface. The force $P_2$ applied a pressure through the outer elastic rim in the lower part of the chamber, onto the rolling surface is the cause of reaction R. The force $P_1$ is a support for the action of the opposite force $P_2$. Due to the contact surface of the tire which is shaped by the road surface, the action of the reaction R on the wheel is directed upwardly perpendicular to the road surface and applied in the center of the forces which cause it.

The tire which causes the reaction of the surface and in a section is shaped as a horizontal oval, under the action of the inner surface starts resuming its shape or in other words starts becoming rounded. A segment of the tire lifts its top , since its bottom in this moment is located and supported against a rigid surface of the road. As for the lower part of the rounding of the portion of the tire, depending on the nature and force of the pulse this rounding can occur with acceleration which increases from the periphery to the central strip. Moreover, in the moment of pushing away the tire can go beyond the limits of its shape and become parabolic. The raising top of the working portion pushes the rigid rim and therefore the whole wheel.

The location of the working portion of the tire which provides a pushing action at one side of the vertical transverse plane of symmetry of the wheel pushes the wheel at one side from the surface toward the adjoining lower oval part of the tire. The given geometrical configuration of the wheel it is actually turned over around its front point of support on the surface $O_T$. Since the outer rim of the wheel is elastic and in its main part remains round, the rolling away of the wheel takes place.

If the rolling of the wheel is subdivided into cycles as shown in FIG. 10, then at the end of the cycle caused by a single pulse moments will occur: The center of the wheel O moves along a horizontal line to $O_1$, the forces $WQ_1$ and F convert into $W_1$, $Q_{11}$ and $F_1$. The point $O_T$ similarly to a center of an elastic support of the wheel which is offset in direction of the movement moves along the roadway and becomes $O^1{}_T$.

It can be seen that the force R will turn over the wheel around the point $O_T$ with the arm B. The arm B moves and is shortened in the zone of lagging and lengthened behind the point $O^1{}_T$ in the zone of rolling on. On the other hand, the force W having the arm A relative to the point $O_T$ counteracts the turning over of the wheel. The arm A also moves with the wheel and obtains its length between the vertical plane of symmetry of the wheel and the point $O'_T$. Thereby each of the arms A and B during movement will maintain its length. In this case the forces R and W multiplied by the arms result in the moments of forces.

The moments acting on the wheel correspond to the following expression: $R \times B \leqq W \times A$. It can be seen from the graphic illustration, and in particular of the embodiments of FIGS. 6, 7 and 11 that the ratio of arms A to B fluctuates as 1 to 2. Thereby if, for example the arm B is more than the arm A twice, the force R can be less than force W and also two times. This shows that there is a double gain in force and energy consumption, without consideration of losses.

In addition in the chambers of the wheels in which the force pulse acts through hydraulic or gaseous medium, an additional force gain takes place in accordance with the Pascal law. As known, it is accompanied by a path loss. In this case the path is a height of a center of deformation of a part of the tire under the chamber but required path can be obtained due to the reduction of force gain, which depends on how many times the working areas of the chambers are greater than the areas of pressure of the pulse.

Depending on the design of the wheel, the chambers, the force application, and the types of the hydraulic medium, its compressibility etc., the range of pressures of the hydraulic medium in the tires and chambers can be different. For wheels with tires without chambers and continuously supplied pulse, in which the hydraulic medium does not participate the pressure of the hydraulic medium is constant. For wheels with closed chambers in the tire in which single pulse is supplied by hydraulic medium the pressure quickly resumes after the removal of the pulse to the common pressure.

The control of the vehicle with for example a rear driving pair composed of the wheels in accordance with the present invention is performed by a vehicle computer. The computer is connected with a speedometer, steering control, braking system and power supply system as shown in FIG. 14 and applicable to all embodiments. Each driving wheel is connected to the control individually, and has individual regulation of the force of the pulse, its position and its turning off, this provides: the beginning of the movement, the increase of the speed, the maintenance of the speed, the deceleration, the stop, the reverse, as well as its operation as a driven wheel. Therefore when the speed of movement of the vehicle increases it is possible to supply the pulse in advance or in other words early, or with intervals, so that the fact of pushing away of the wheel from the surface is performed at the necessary place and at in the necessary moment at any movement speed of the vehicle. When the vehicle is turned each rearwheel describes an arc of a different length and required a different movement speed. For this purpose, one of the wheels when turning can become a driven wheel. However, after the turning the synchronization of the operation of the driving wheels immediately resumes.

When the wheel moves on the surface with a raise, the rolling continues if the deformation of pushing away remains substantially behind the vertical plane of symmetry of the wheel. For this purpose it is desirable to use deep tires. When necessary the degree of flattening of the wheel during movement can be regulated by introduction and removal of a portion of the hydraulic medium. When the vehicle with the inventive wheel must overcome steep raises, or increase its movement speed over a short time very quickly, a combination with an additional engine can be used as shown in FIG. 14.

When the wheel is designed in accordance with the present invention, it is not necessary to use an internal combustion engine, there are no transmissions and differential transmissions for driving wheels, the energy consumption for movement is substantially reduced, and heavy and expensive batteries are not needed. An ecologically clean means for transportation is provided, the vehicle can be used with non-combustion engine, the efficiency is substantially increased, the number of assemblies is reduced and therefore the weight is reduced as well so that the vehicle is less expensive, the maintenance is simpler, easier and faster.

It will be understood that each of the elements described above, or two or more together, may also find a useful application in other types of constructions differing from the types described above.

While the invention has been illustrated and described as embodied in wheel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wheel, comprising a rigid rim; a soft tire arranged on said rigid rim; and means for generating different pressures from inside in said soft tire in contact zone of tire with road surface, at opposite sides of a vertical transverse plane of symmetry of said rim so as to cause pushing of said tire with rim of wheel along a roadway, said tire being subdivided in a plurality of separate chambers filled with a medium and spaced from one another in a circumferential direction, said means for generating different pressures being operative for generating a greater additional pressure in the contact zone behind the vertical transverse plane of symmetry of said rim, said means being formed so that when a speed of vehicle increases said means producing a pulse for generating different pressure in a chamber before the latter touches the ground.

2. A method of rolling a wheel, comprising the steps of providing a rigid rim; placing a soft tire on said rigid rim; and generating different pressures in contact zone of tire with road surface, at opposite sides of a vertical transverse plane of symmetry of the rim so as to cause a pushing of said tire with rim along a roadway, subdividing the tire into a plurality of chambers which are spaced from one another in a circumferential direction, filling the chambers with a medium, said generating including generating a greater additional pressure in the contact zone behind the vertical transverse plane of symmetry of said rim, said means being formed so that when a speed of vehicle increases said means producing a pulse for generating different pressures in a chamber before the latter touches the ground.

3. A wheel, comprising a rigid rim; a soft tire arranged on said rigid rim and filled with a medium; and means for generating different pressures from inside in said soft tire in contact zone of tire with road surface, at opposite sides of vertical transverse plane of symmetry of said rim, so as to cause pushing of said tire with rim of wheel along the roadway, said means for generating different pressures including an electromagnet, a magnetized material and means for producing an electromagnetic pulse received inside said tire by said magnetized material so as to generate a repulsion of said magnetized material from said magnet, whereby said magnetized material produces a greater additional pressure in the contact zone behind the vertical transverse plane of symmetry of the rim, to move the wheel in a forward direction.

4. A method of rolling a wheel, comprising the steps of providing a rigid rim; placing a soft tire on said rigid rim; and generating different pressures in contact zone of tire with road surface, at opposite sides of vertical transverse plane of symmetry of the rim so as to cause a pushing of said tire with rim along a roadway, said generating including producing an electromagnetic pulse received inside the tire so as to generate a greater additional pressures in the contact zone, behind the vertical transverse plane of symmetry of the rim, to move the wheel in a forward direction.

5. A wheel, comprising a rigid rim; a soft tire arranged on said rigid rim and filled with a medium; and means for generating different pressures from inside in said soft tire in contact zone of tire with road surface, at opposite sides of a vertical transverse plane of symmetry of said rim so as to cause pushing of said tire with rim of wheel along a roadway, said means being formed so that a greater pressure is generated behind of said vertical transverse plane of symmetry during movement of the wheel and a greater contact surface of the tire with the roadway is provided behind said vertical transverse plane of symmetry of said rim, when moved in a forward direction, said means being inclined to a radius of the rim so as to produce in moment of action a pressure perpendicular to a road surface, with a greater contact zone of the tire with the road surface behind the vertical transverse plane of symmetry to produce a greater arm of a force of a road reaction which forces the wheel forward, said means being formed so that when a speed of vehicle increases said means producing a pulse for generating different pressure in a chamber before the latter touches the ground.

6. A method of rolling a wheel, comprising the steps of providing a rigid rim; placing a soft tire on said rigid rim and filling the tire with a medium; and generating different pressures in contact zone of tire with road surface, at opposite sides of a vertical transverse plane of symmetry of the rim so as to cause a pushing of said tire with rim along a roadway, said generating including providing a greater pressure behind of the vertical transverse plane of symmetry of the rim and providing a greater surface of contact of the tire with the roadway behind the vertical transverse plane of symmetry of the rim, said generating including generating by means inclined to a radius of the rim so as to produce, in moment of action a pressure perpendicular to a road surface, with a greater contact zone of the tire with the road surface behind the vertical transverse plane of symmetry to produce a greater arm of a force of a road reaction which forces the wheel forward, said means being formed so that when a speed of vehicle increases said means producing a pulse for generating different pressure in advance in a chamber before the latter touches the ground.

7. A wheel, comprising a rigid rim; a soft tire arranged on said rigid rim and filled with a medium; and means for generating different pressures from inside in said soft tire in contact zone of tire with road surface, at opposite sides of vertical transverse plane of symmetry of said rim, so as to cause pushing of said tire with rim of wheel along a roadway, said means for generating different pressures including means for producing an electromagnetic pulse which pushes a plunger connected with means for producing a mechanical pulse of a pushing auxiliary wheel inside said tire so as to generate a greater additional pressure in the contact zone behind the vertical transverse plane of symmetry of the rim, to move the wheel in a forward direction.

8. A method of rolling a wheel, comprising the steps of providing a rigid rim; placing a soft tire on said rigid rim; and generating different pressures in contact zone of tire with road surface, at opposite sides of vertical transverse plane of symmetry of the rim so as to cause a pushing of said tire with rim along a roadway, said generating including producing an electromagnetic pulse and converting the latter into a mechanical pulse inside the tire so as to generate a greater additional pressure in the contact zone, behind the vertical transverse plane of symmetry of the rim, to move the wheel in a forward direction.

9. A wheel, comprising a rigid rim; a soft tire arranged on said rigid rim; and means for generating different pressures from inside in said soft tire in contact zone of tire with road surface, at opposite sides of a vertical transverse plane of symmetry of said rim so as to cause pushing of said tire with rim of wheel along a roadway, said tire being subdivided in a plurality of separate chambers spaced from one another in a circumferential direction and filled with medium, said means for generating different pressures being operative for generating different pressures, said means for generating different pressures is formed so as to produce a hydraulic pulse inside said tire so as to generate said different pressure in the contact zone of the tire, said means being formed so that when a speed of vehicle increases said means producing a pulse for generating different pressure in a chamber before the latter touches the ground.

* * * * *